United States Patent [19]
Krishnan et al.

[11] Patent Number: 5,809,070
[45] Date of Patent: Sep. 15, 1998

[54] HIGH SPEED DATA COMMUNICATIONS USING MULTIPLE LOW SPEED MODEMS

[75] Inventors: Kalyan Krishnan, Fremont; Leo Salinas, Mountain View, both of Calif.

[73] Assignee: Flat Connections, Inc., Fremont, Calif.

[21] Appl. No.: 695,054

[22] Filed: Aug. 9, 1996

Related U.S. Application Data

[60] Provisional application No. 60/012,379, Feb. 27, 1996.
[51] Int. Cl.$^6$ .................................................. H04B 1/38
[52] U.S. Cl. .......................... 375/222; 375/260; 375/377; 370/465; 379/93.06; 379/93.07; 395/309
[58] Field of Search ..................................... 375/220, 222, 375/260, 377; 370/431, 433, 465, 468; 379/93.01, 93.06, 93.07; 395/309

[56] References Cited

U.S. PATENT DOCUMENTS

| | | | |
|---|---|---|---|
| 4,630,286 | 12/1986 | Betts | 375/261 |
| 4,637,035 | 1/1987 | Betts | 375/222 |
| 4,775,987 | 10/1988 | Miller | 375/260 |
| 4,864,567 | 9/1989 | Giorgio | 370/359 |
| 5,317,415 | 5/1994 | Kinami et al. | 358/425 |
| 5,390,239 | 2/1995 | Morris et al. | 379/93.08 |

Primary Examiner—Don N. Vo
Assistant Examiner—Amanda T. Le
Attorney, Agent, or Firm—Fish & Neave; Nicola A. Pisano

[57] ABSTRACT

Methods and apparatus for providing high speed inter-computer data transmission using multiple low speed communication links. At the transmitting site, a high speed data stream is split into multiple low speed data stream and multiplexed onto to the low speed links. The receiver demultiplexes, buffers, and synchronizes the multiple low speed data streams to recreate the high speed data stream.

23 Claims, 3 Drawing Sheets

HIGH SPEED DATA COMMUNICATIONS USING MULTIPLE LOW SPEED MODEMS

This application claims benefit of USC 119(e) of any U.S. Provisional Application No. 60/012,379, filed Feb. 27, 1996.

BACKGROUND OF THE INVENTION

Modems provide a means for remote computers to communicate over the Public Switched Telephone Network ("PSTN"), and have been in use for several decades. While data transmission rates using analog modems have risen considerably over the past decades, from 120 bits-per-second (bps) to 28,800 bps, it is unlikely that they will exceed 35,000 bps due to the available bandwidth of the PSTN.

There has been a rapid increase in the use of computer networks, such as the Internet, for publishing, sharing and accessing data on remote computers. The increasing amount of "multimedia content" present causes the data to be voluminous. Many users connect to these networks via "dial-up connections" using relatively low speed modems, resulting in lengthy data transfer (download) times. Thus, there is a need for high speed modem connections.

While new digital technologies, such as Integrated Subscriber Digital Network (ISDN), may bring very high speed data communications, they are relatively expensive and are not yet widely available. However, PSTN connections are inexpensive, widely available, and additional lines may be added at little or no cost. Thus it would be desirable to provide a method for communicating data at high rates using PSTN-type connections with readily available modems and computers.

SUMMARY OF THE INVENTION

The objects of the present invention are met by providing methods and apparatus for achieving high data transmission rates using multiple, simultaneous, parallel PSTN connections. In a first embodiment of the invention, two or more modems are coupled to a host computer. For example, two modems may be coupled to separate RS-232 ports of an IBM compatible PC or other personal computer. An operating system component controls the modems either as independent communications channels, or for high speed data transmissions, "combines," or "bonds" multiple PSTN-type connections together to create a high speed data link. This is accomplished by splitting a high speed data stream into multiple lower speed data streams and transmitting each lower speed data stream via a low speed modem and PSTN connection.

In an alternative embodiment of the present invention, a communication controller is coupled between the host computer and the modems. The controller off-loads execution of the multi-link protocol from the host processor. In this configuration a single local, high speed link connects the host computer to the communications controller and two or more links connect the communication controller to PSTN based links via modems.

A third embodiment of the present invention, is a multi-link modem, including a communication controller and standard modem circuitry. The modem has a high speed communications link between the communication processor and the host processor. The modem also has a second port for connecting to a second modem in a daisy chain fashion. Additional multilink modems may be daisy-chained to provide three, four, or more PSTN links, thereby increasing the maximum data rate.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which.

DETAILED DESCRIPTION OF THE INVENTION

Figure 1:
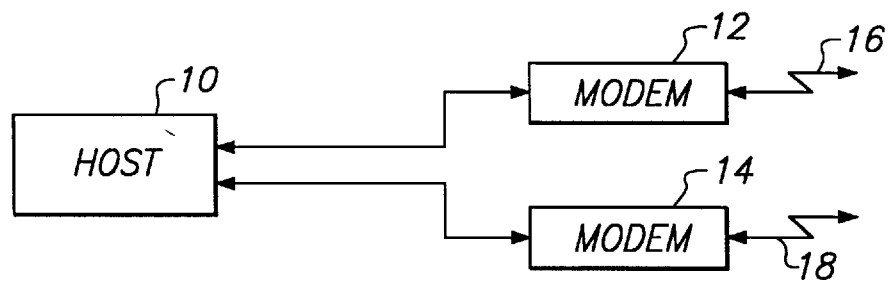
FIG. 1 is an illustrative block diagram of a first embodiment of an inter-computer communication system employing multiple communication links in accordance with the principles of the present invention.

Referring first to FIG. 1, a first embodiment of the present invention is described. Host computer 10 may be any general purpose computer such as an IBM AT-PC or Apple McIntosh type computer. Modems 12 and 14 are coupled to separate data ports of host computer 10 and to separate telephone lines 16 and 18. Although only two modems are shown, additional modems may be used, as long as each one is coupled to a separate data port of host computer 10.

Host computer 10 is preferably programmed with communication software so that it may transfer data to another computer via modem 12 or 14. Host computer 10 is also programmed with link control software implementing a multi-link data communication protocol such as the Multi-Link Point-to-Point Protocol (MLPPP). MLPPP provides a method for a transmitting site to split a single high speed data stream into multiple parallel data streams which are multiplexed onto multiple low speed data links. A receiving site receives and demultiplexes the multiple low speed data streams to recover the original high speed data stream.

In a preferred embodiment the link control software dynamically adds and deletes low speed links as required to support the rate of data transmission. For example, as the data rate increases beyond the capacity of modem 12 and PSTN line 16, a second PSTN connection may be established via modem 14 and PSTN line 18. Subsequently, as the data rate decreases to a level within the capacity of a single modem, modem 14 may be disconnected. Preferably, the link control software includes a hysteresis characteristic in the code that deletes unneeded low speed links so that modem 14 is not disconnected prematurely due to a temporary reduction in the data transmission rate.

Various strategies may be employed by the link control software executing on host computer 10 to maximize data throughput. For example, the link control software may transmit as much data as possible via modem 12, so that modem 12 is operating near its maximum possible data rate, and transmit any additional data via modem 14. Alternatively, the link control software may distribute the data evenly between modems 12 and 14 thereby equalizing the load on each.

In addition, it may be desirable to transmit the data so that it is received nearly in sequence so as to minimize the amount of processing required to reassemble the high speed data stream. For example, if the data transmission rates across PSTN links 16 and 18 are unequal, the link control software may transmit data proportional to the data rate of modems 12 and 14. Thus, if modem 12 transmits at 28.8 kbps and modem 14 transmits at only 14.4 kbps, link control the software may transmit twice as much data via modem 12 as via modem 14.

In a particularly preferable embodiment of the invention, the link control software is also capable of operating modems 12 and 14 as two distinct data links. For example, host computer 10 may be a modem server on a local area computer network. It may then be desirable to be able to transmit data to a first remote computer via modem 12 and transmit the same or different data to a second remote computer via modem 14. Thus, maximum data communication flexibility is maintained.

Figure 2A:
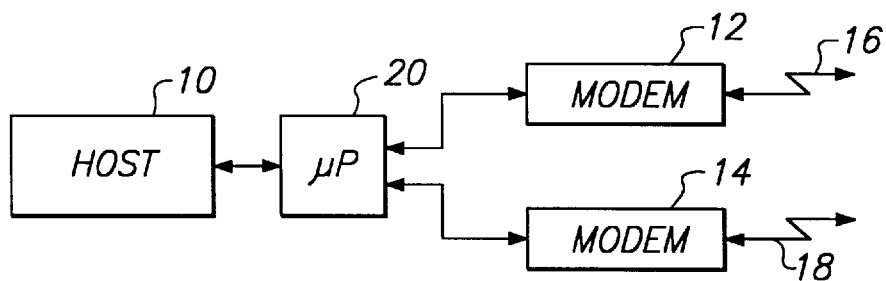
FIGS. 2A and 2B are illustrative block diagrams of an alternative embodiment of the multiple link data communications system of the present invention.

Referring now to FIG. 2A, an alternative embodiment of the present invention is described, in which host computer 10, modems 12 and 14, and PSTN lines 16 and 18 are as described above in connection with FIG. 1. Interposed between host computer 10 and modems 12 and 14 is communication controller 20. Communication controller 20, which may be a stand-alone unit, or an "add-in" card within host computer 10, executes link control software similar to the software executed on host processor 10 of FIG. 1. The controller off-loads link control processing from the host thereby reducing the processing load on the processor of host computer 10.

Figure 2B:
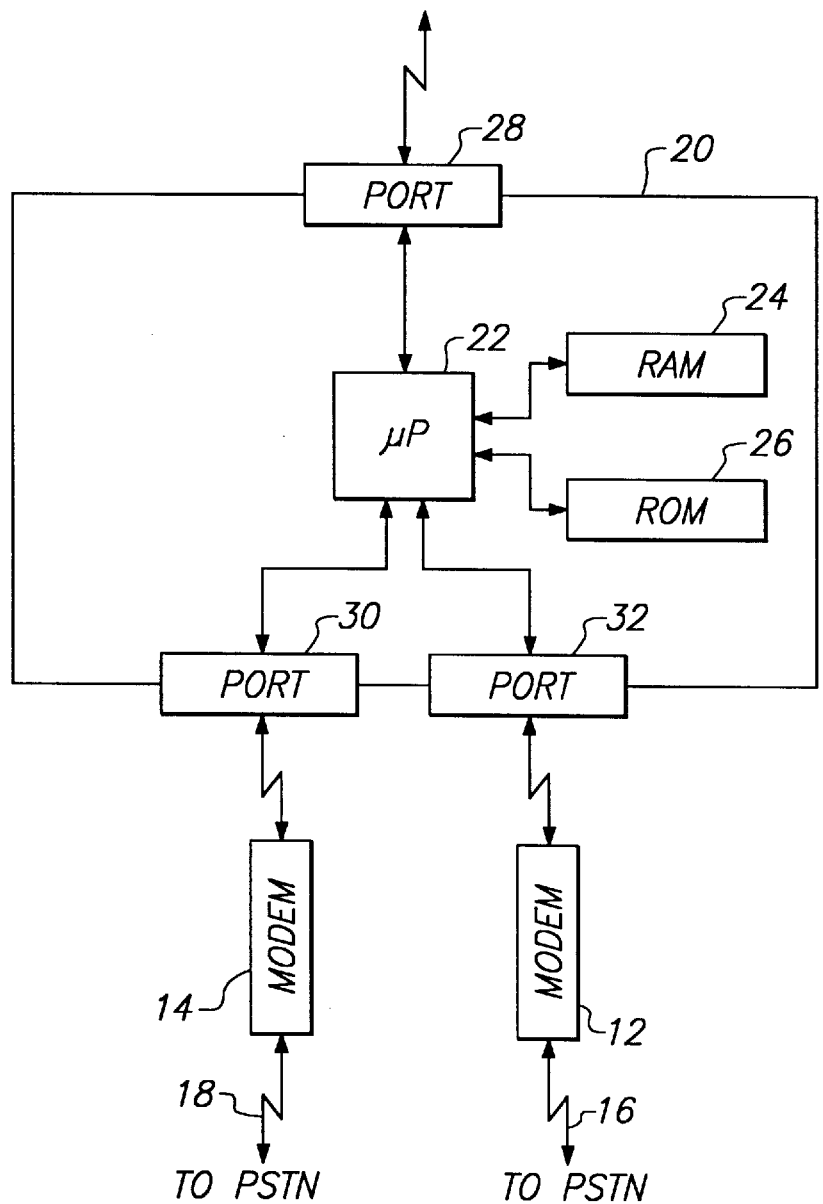

As shown in FIG. 2B, communication controller 20 includes processor 22, RAM 24, ROM 26, high speed data port 28, and low speed ports 30 and 32 for connecting to multiple modems. Processor 22 may be any sufficiently powerful general purpose processor, such as a 80386 class processor manufactured by Intel, of Santa Clara, Calif. Alternatively, processor 22 may be a digital signal processor (DSP), such as the 56300 family of DSP's manufactured by Motorola, Inc. Schaumburg, Ill.

ROM 26 contains the link control software and may also contain various diagnostic and troubleshooting programs. RAM 24 provides buffering for incoming and outgoing data, as well as a scratchpad area for the link control software. In addition, RAM 24 may include a non-volatile portion for the storage of configuration and control parameters of the link control software.

Data port 28 may be a serial port compatible with the EIA-232 or Universal Serial Bus (USB) standards, or a parallel port compatible with the Enhanced Parallel Port standard. Alternatively, data port 28 may be a connection to a local area network such as an Ethernet or Token Ring network. To maintain compatibility with most current stand-alone modems, ports 30 and 32 are standard EIA-232 ports, although it is anticipated that parallel ports and high speed serial ports may become common modem interfaces in the future.

In one embodiment of the link controller of FIGS. 2A and 2B, the controller effectively hides multiple modems 12 and 14 from host computer 10 so that controller 20 appears to be a single high speed data modem connected to host 10 via a single physical port. In an alternative embodiment, a software program, typically referred to as a device driver, is installed in host computer 10. The device driver creates multiple logical connections between host 10 and controller 20, wherein each logical connection corresponds to a modem, such as modems 12 and 14. Thus, even though there is only one physical connection between host 10 and controller 20, application software running on host computer 10 "sees" multiple logical connections.

Figure 3A:
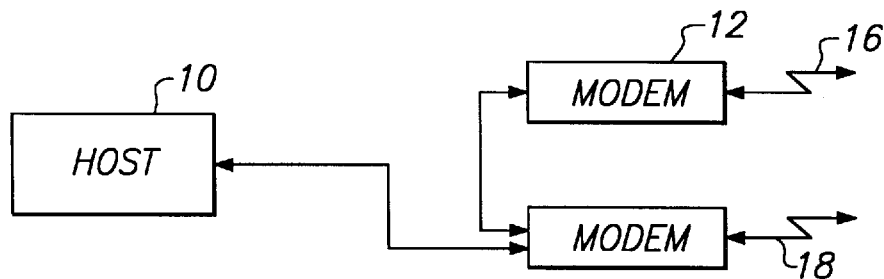
FIGS. 3A and 3B are illustrative block diagrams of another embodiment of a multiple link data communication system in accordance with the principles of the present invention.

Referring now to FIG. 3, another embodiment of the present invention is disclosed. In the embodiment of FIG. 3A, modem 14 and communication controller 20 of FIG. 2A are essentially combined into multilink modem 34. Modem 12 is then "daisy-chained" off of multilink modem 34.

Figure 3B:
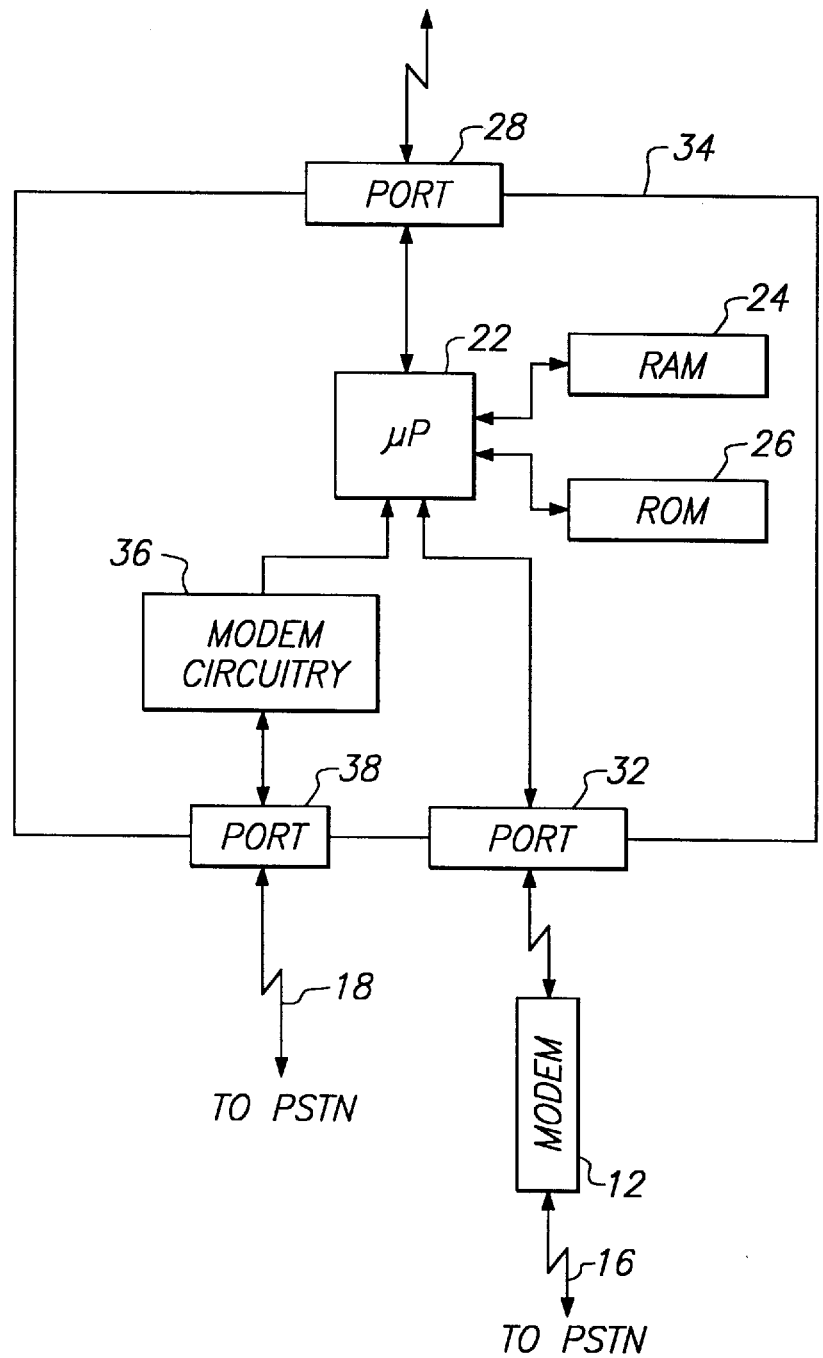

As shown in FIG. 3B, multilink modem 34 includes processor 22, RAM 24, ROM 26, and data ports 28 and 32 as discussed in connection with FIGS. 2A and 2B. Multilink modem 34 also including modem circuitry 36 and telephone jack 38. Modem circuitry 36 implements standard modem signaling conventions and may comprise an off-the-shelf modem chip set. Alternatively, modem circuitry 36 may comprise custom modem circuitry that is simplified to take advantage of the processing power of processor 22. Telephone jack 38 is any suitable jack for providing a connection to the PSTN, and may for example be an RJ-45 type jack. Several multilink modems may be cascaded between host 10 and standard modem 12 to increase the maximum possible data throughput.

In the embodiment of FIG. 3, the link control software running on processor 22 must know how many modems are "downstream." This information may be obtained from Hayes AT-style commands that are transmitted by host computer 10 during initialization of communications applications running on host 10. Preferably, multilink modems 34 include software and protocols to automatically determine this information when initially powered-on or reset. For example, most modems provide a capability for a host to interrogate configuration information from the modem. Thus, each modem in the daisy chain could interrogate its downstream neighbor to determine the total number of downstream links, wherein each modem returns a count of 1 plus the count received from the downstream neighbor. As will of course be understood by one skilled in the art more elaborate protocols are possible.

By determining the number of downstream modems, each multilink modem in the daisy chain can determine how to partition outgoing data for transmission over the PSTN links. For example, if there are a total of three modems (two multilink and one standard), the multilink modem farthest upstream may transmit 40% of the data over its internal modem and pass the remaining 60% to the next multilink modem. This modem may in turn transmit half of the remaining 60% and send the remainder to the standard modem for transmission.

One skilled in the art will appreciate that the present invention may be practiced by other than the described embodiments, which are presented for purposes of illustration and not of limitation.

What is claimed is:

1. Apparatus for high data rate communications using multiple communication links to transmit data between a host computer and at least one remote computer, the apparatus comprising:

a processor; and first modem circuitry coupled to the processor and to a first communication link, the first communication link capable of transmitting data at a maximum rate of N bits/second;

second modem circuitry coupled to the processor and to a second communication link, the second communication link capable of transmitting data at a maximum rate of M bits/second, the processor programmed to determine a total rate of data transmission between the host computer and the remote computer, and to transmit the data via the first modem circuitry when the total rate of data transmission is less than a first threshold, the processor further programmed to establish the second communication link responsive to the total rate of data transmission exceeding the first threshold, so that a first portion of the data is transmitted via the first modem circuitry, and a second portion of the data is transmitted via the second modem circuitry.

2. The apparatus of claim 1 wherein the processor determines the first and second portions of the data proportional to the maximum rates N and M of the first and second communication links, respectively.

3. The apparatus of claim 1 wherein the first and second communication links couple the first and second modem circuitries to a first remote computer.

4. The apparatus of claim 1 wherein the first communication link couples the first modem circuitry to a first remote computer and the second communication link couples the second modem circuitry to second remote computer.

5. The apparatus of claim 1 wherein the processor comprises a portion of the host computer.

6. The apparatus of claim 1 wherein the processor is coupled to the host computer.

7. The apparatus of claim 6 further comprising a housing for enclosing the processor, the housing including a first interface adapted to couple the processor to a host computer for communicating data therebetween, wherein the transmitted data are communicated between the processor and the host computer via the first interface.

8. The apparatus of claim 7 wherein the housing also encloses the first modem circuitry, the housing further including a second interface adapted to couple the processor to the second modem circuitry.

9. The apparatus of claim 1 wherein the rates N and M are equal.

10. A modem comprising:
a first port for receiving data from a host computer;
a second port for coupling the modem to a first remote computer via a first communication link, the first communication link having a maximum data rate of N;
a third port for coupling the modem to a second modem; and
a processor coupled to the first, second, and third ports, the processor programmed to coordinate data communications between the host computer, the first remote computer, and the second modem, to determine a first threshold rate, to determine a total rate of data transmission between the host computer and the first remote computer, and to establish a second communication link having a maximum data rate of M with the first remote computer via the third port and the second modem, responsive to the total rate of data transmission exceeding the first threshold rate.

11. The modem of claim 10 wherein the processor transmits data from the host computer to the first remote computer at a data rate of N+M by transmitting a first portion of the transmitted data via the second port and transmitting a second portion of the transmitted data via the third port and the second modem.

12. The modem of claim 11 wherein the processor selects the first and second portions of transmitted data proportional to the data rates of the first and second communication links, respectively.

13. The modem of claim 10 wherein the first threshold rate is based on the maximum data rate of the first modem over the first communications link.

14. The modem of claim 10 wherein the processor disestablishes the second communication link responsive to the rate of data communicated between the host computer and the first remote computer falling below a second threshold rate.

15. The modem of claim 10 wherein the processor establishes a second communication link with a second remote computer via the third port and the second modem responsive to the host computer requiring to communicate with the second remote computer.

16. A method of transmitting data from a host computer to a remote computer at a high data rate using multiple communication links comprising:
establishing a first communication link to a remote computer;
transmitting data to the remote computer over the first communication link;
determining the rate of data transmission between the host computer and the remote computer;
establishing a second communication link to the remote computer responsive to the rate of data transmission exceeding a first threshold rate; and
transmitting a first portion of the data to the remote computer over the first communication link and a second portion of the data to the remote computer over the second communication link.

17. The method of claim 16 wherein establishing a second communication link to the remote computer responsive to the rate of data transmission exceeding a first threshold rate further comprises:
determining a maximum data throughput of the first communication link; and
setting the first threshold to a predetermined percentage of the maximum data throughput.

18. The method of claim 16 further comprising:
determining a total rate of data transmission between the host computer and the remote computer over the first and second communication links;
disestablishing the first communication link responsive to the total data rate falling below a second threshold rate; and
transmitting the data to the remote computer over the second communication link.

19. The method of claim 16 further comprising:
determining a total rate of data transmission between the host computer and the remote computer over the first and second communication links;
disestablishing the second communication link responsive to the total data rate falling below a second threshold rate; and
transmitting the data to the remote computer over the first communication link.

20. The method of claim 16 further comprising:
determining a rate of data transmission between the host computer and the remote computer over the first communication link;
determining a rate of data transmission between the host computer and the remote computer over the second communication link;
disestablishing one of the first and second communication links responsive to the total data rate being within the capacity of the other of the first and second communication links; and
transmitting the data to the remote computer over a remaining one of the first and second communication links.

21. The method of claim 16 wherein transmitting the first and second portions of the data to the remote computer over the first and second communication links further comprises:
determining a maximum data rate of the first and second communication links; and selecting the size of the first and second portions of the data based on the maximum data rate of the first and second communication links.

22. The method of claim 21 wherein selecting the size of the first and second portions of the data based on the maximum data rate of the first and second communication links further comprises:

selecting the first and second portions proportional to the maximum data rates of the first and second communication links, respectively.

23. The method of claim 21 wherein selecting the size of the first and second portions of the data based on the maximum data rate of the first and second communication links further comprises:

selecting the first and second portions of data to cause the data rate of one of the respective first and second communication links to be substantially at its maximum data rate.

* * * * *